United States Patent
Zhou et al.

(10) Patent No.: US 10,891,322 B2
(45) Date of Patent: Jan. 12, 2021

(54) AUTOMATIC CONVERSATION CREATOR FOR NEWS

(71) Applicant: MICROSOFT TECHNOLOGY LICENSING, LLC, Redmond, WA (US)

(72) Inventors: Ming Zhou, Redmond, WA (US); Yu-Ting Kuo, Redmond, WA (US); Furu Wei, Redmond, WA (US); Lei Cui, Redmond, WA (US); Shaohan Huang, Redmond, WA (US); Kati London, Redmond, WA (US); Wei-Ying Ma, Redmond, WA (US); Haoyong Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/772,472

(22) PCT Filed: Oct. 26, 2016

(86) PCT No.: PCT/US2016/058810
§ 371 (c)(1),
(2) Date: Apr. 30, 2018

(87) PCT Pub. No.: WO2017/075017
PCT Pub. Date: May 4, 2017

(65) Prior Publication Data
US 2018/0322188 A1 Nov. 8, 2018

(30) Foreign Application Priority Data
Oct. 30, 2015 (CN) .......................... 2015 1 0728069

(51) Int. Cl.
*G06F 16/332* (2019.01)
*G06F 16/335* (2019.01)
(Continued)

(52) U.S. Cl.
CPC ........ *G06F 16/3329* (2019.01); *G06F 16/335* (2019.01); *G06F 16/3347* (2019.01);
(Continued)

(58) Field of Classification Search
None
See application file for complete search history.

(56) References Cited

U.S. PATENT DOCUMENTS 8,806,320 B1 8/2014 Abdo
8,819,719 B1 8/2014 Chen et al.
(Continued)

FOREIGN PATENT DOCUMENTS

CN 101765840 A 6/2010
CN 103051513 A 4/2013
(Continued)

OTHER PUBLICATIONS

"Non Final Office Action Issued in U.S. Appl. No. 15/578,203", dated Oct. 22, 2019, 12 Pages.
(Continued)

*Primary Examiner* — Kim T Nguyen
(74) *Attorney, Agent, or Firm* — Merchant & Gould (57) ABSTRACT

An example environment can automatically generate content for a conversation in response to a presented content item. An example computing device receives information associated with a content item produced by a source system, the content item being accessible to other the computing devices via a network. In response to receiving the information, the computing device identifies a start comment. In response to identifying the start comment, the computing device identifies a reply to the start comment using at least a ranking model.

20 Claims, 5 Drawing Sheets

US 10,891,322 B2

Page 2

(51) Int. Cl.
*G06F 16/33* (2019.01)
*G06F 16/9535* (2019.01)
*G06Q 50/00* (2012.01)
*G06F 40/284* (2020.01)
*G06K 9/62* (2006.01)

(52) U.S. Cl.
CPC ........ *G06F 16/9535* (2019.01); *G06F 40/284* (2020.01); *G06K 9/6269* (2013.01); *G06Q 50/01* (2013.01)

(56) References Cited

U.S. PATENT DOCUMENTS

| | | | |
|---|---|---|---|
| 8,972,413 | B2 | 3/2015 | Lee et al. |
| 9,386,107 | B1 | 7/2016 | Browning et al. |
| 2007/0118794 | A1 | 5/2007 | Hollander et al. |
| 2007/0260564 | A1 | 11/2007 | Peters et al. |
| 2010/0278453 | A1 | 11/2010 | King |
| 2012/0226996 | A1 | 9/2012 | Park et al. |
| 2012/0310922 | A1* | 12/2012 | Johnson ................ G06F 16/248 707/722 |
| 2012/0311618 | A1 | 12/2012 | Blaxland |
| 2013/0073545 | A1 | 3/2013 | Jain |
| 2013/0091419 | A1 | 4/2013 | Caliman et al. |
| 2013/0332840 | A1 | 12/2013 | Roth et al. |
| 2013/0332856 | A1 | 12/2013 | Sanders et al. |
| 2014/0033015 | A1 | 1/2014 | Shaver |
| 2014/0052540 | A1 | 2/2014 | Rajaram et al. |
| 2014/0094241 | A1* | 4/2014 | Guinn ................ G07F 17/3258 463/16 |
| 2014/0181694 | A1 | 6/2014 | Barman |
| 2014/0280236 | A1 | 9/2014 | Faller et al. |
| 2014/0298201 | A1* | 10/2014 | Tsui ...................... G06Q 50/01 715/753 |
| 2014/0344359 | A1 | 11/2014 | Broz et al. |
| 2015/0026192 | A1* | 1/2015 | Kamerman ........... G06F 16/335 707/748 |
| 2015/0106304 | A1* | 4/2015 | Gupta ...................... G06N 5/04 706/11 |
| 2015/0120718 | A1* | 4/2015 | Luo ....................... G06F 16/335 707/728 |
| 2015/0127591 | A1* | 5/2015 | Gupta .................... G06Q 50/01 706/12 |
| 2015/0149502 | A1 | 5/2015 | Rao et al. |
| 2015/0261853 | A1 | 9/2015 | Shao |
| 2015/0381555 | A1* | 12/2015 | Faller ...................... H04L 51/32 709/206 |
| 2016/0171111 | A1 | 6/2016 | Kraft et al. |
| 2016/0246769 | A1* | 8/2016 | Screen ................. H04L 67/1097 |
| 2016/0269345 | A1* | 9/2016 | Weizman ................ H04L 51/12 |
| 2016/0277328 | A1 | 9/2016 | Ishizuka |
| 2018/0150450 | A1 | 5/2018 | Wei et al. |
| 2018/0159804 | A1 | 6/2018 | Wei et al. |
| 2018/0322188 | A1 | 11/2018 | Zhou et al. |

FOREIGN PATENT DOCUMENTS

| | | | |
|---|---|---|---|
| CN | 103412920 | A | 11/2013 |
| CN | 103581280 | A | 2/2014 |
| CN | 103853761 | A | 6/2014 |
| CN | 104504131 | A | 4/2015 |
| CN | 104571818 | A | 4/2015 |
| CN | 104820704 | A | 8/2015 |
| CN | 104981792 | A | 10/2015 |
| WO | 2008031625 | A2 | 3/2008 |
| WO | 2014086224 | A1 | 6/2014 |

OTHER PUBLICATIONS

"Non Final Office Action Issued in U.S. Appl. No. 15/578,195", dated Mar. 7, 2019, 13 Pages.
"Search Report Issued in European Patent Application No. 15893577.5", dated Jan. 22, 2019, 10 Pages.
"Non Final Office Action Issued in U.S. Appl. No. 15/578,195", dated Aug. 2, 2019, 15 Pages.
"First Office Action and Search Report Issued in Chinese Pate Application No. 201510728069.0", dated Jul. 24, 2019, 14 Pages.
"First Office Action and Search Report Issued in Chinese Pate Application No. 201580043166.4", dated Jul. 29, 2019, 15 Pages.
"The Research and Implementation of QA Techniques Based on Forum Data", In Chinese Doctor Dissertation and Master Thesis of Information Science and Technology, May 15, 2015, 75 Pages.
"Office Action Issued in European Patent Application No. 15893576.7", dated Apr. 8, 2019, 8 Pages.
"Final Office Action Issued in U.S. Appl. No. 15/578,195", dated Nov. 2, 2018, 13 Pages.
"Non Final Office Action Issued in U.S. Appl. No. 15/578,195", dated Jul. 10, 2018, 15 Pages.
"Search report Issued in European Patent Application No. 15893576.7", dated Dec. 19, 2018, 8 Pages.
Delort, Jean Yves., "Identifying Commented Passages of Documents Using Implicit Hyperlinks", In Proceedings of the Seventeenth Conference on Hypertext and Hypermedia, Aug. 22, 2006, 11 Pages.
Ma, et al., "Opinion target extraction in Chinese News Comments", In Proceedings of the 23rd International conference on Computational Linguistics: Posters, Aug. 23, 2010, pp. 782-790.
"International Search Report and Written Opinion Issued in PCT Application No. PCT/CN2015/080222", dated Mar. 1, 2016, 11 Pages.
Vo, et al., "FBK-TR: Applying SVM with Multiple Linguistic Features for Cross-Level Semantic Similarity", In Proceedings of the 8th International Workshop on Semantic Evaluation, Aug. 2014, pp. 284-288.
"International Search Report and Written Opinion Issued in PCT Application No. PCT/CN2015/080223", dated Feb. 25, 2016, 11 Pages.
"International Search Report & Written Opinion Issued in PCT Application No. PCT/US2016/058810", dated Dec. 14, 2016, 10 Pages.
"Second Office Action Issued in Chinese Patent Application No. 201580043166.4", dated Mar. 20, 2020, 6 Pages.
"Office Action Issued in Chinese Patent Application No. 201510728069.0", dated Apr. 15, 2020, 6 Pages.
"Office Action Issued in European Patent Application No. 15893577.5", dated Jan. 2, 2020, 6 Pages.
"Notice of Allowance Issued in U.S. Appl. No. 15/578,195", dated Feb. 27, 2020, 14 Pages.
"Second Office Action Issued in Chinese Patent Application No. 201510728069.0", dated Feb. 7, 2020, 11 Pages.
"Non Final Office Action Issued in U.S. Appl. No. 15/578,203", dated Apr. 13, 2020, 12 Pages.
"Third Office Action Issued in Chinese Patent Application No. 201580043166.4", dated Aug. 4, 2020, 7 Pages.
"Final Office Action Issued in U.S. Appl. No. 15/578,203", dated Aug. 18, 2020, 12 Pages.
"Non Final Office Action Issued in U.S. Appl. No. 15/578,203", dated Nov. 6, 2020, 10 Pages.

* cited by examiner

AUTOMATIC CONVERSATION CREATOR FOR NEWS

CROSS-REFERENCE TO RELATED APPLICATION

This application is a U.S. National Stage Application of PCT/US2016/058810, filed Oct. 26, 2016, which claims priority to Chinese Patent Application No. 201510728069.0, filed Oct. 30, 2015, which applications are hereby incorporated by reference. To the extent appropriate, a claim of priority is made to each of the above disclosed applications.

BACKGROUND

There exist many websites that provide one-way information delivery with homogenous content presentation, making users passively receive a lot of information to read. This adds a burden to a user attempting to interpret a presented article, thus diminishing the user's experience.

SUMMARY

Technologies are described herein can provide an automatic conversation generation in response to a presented article.

In some examples, a computing device is configured to receive information associated with a content item produced by a source system. The content item is accessible to other the computing devices via a network. The computing device can output at least a portion of the content item. In response to receiving the information, the computing device identifies a start comment and identifies a reply to the start comment based at least in part on a ranking model. The computing device can output the start comment and the reply.

Configurations disclosed herein allow receiving information associated with a content item produced by a source system, the content item being accessible to other the computing devices via a network and receives a comment associated with the content item, the comment produced by one of the other computing devices. In response to receiving the information and the comment, the computing device predicts a reply to the comment based at least on a prediction/ranking model.

This provides a more intuitive interactive user experience and improves the user's efficiency in interacting with a computer. This reduces the burden to a user, thus increasing the user's efficiency and experience.

It should be appreciated that the above-described subject matter may be implemented as a computer-controlled apparatus, a computer process, a computing system or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the leftmost digit(s) of a reference number identifies the figure in which the reference number first appears. The same reference numbers in different figures indicate similar or identical items.

DETAILED DESCRIPTION

Overview

Examples described herein provide constructs of a system having a host server that provides comments and replies in association with network accessible content, such as a news article. The system also has a client-side component for presenting content with comments and replies in a conversational format where two entities communicate with each other.

Various examples, scenarios, and aspects are described further with reference to FIGS. 1-5.

Illustrative Environment

Figure 1:
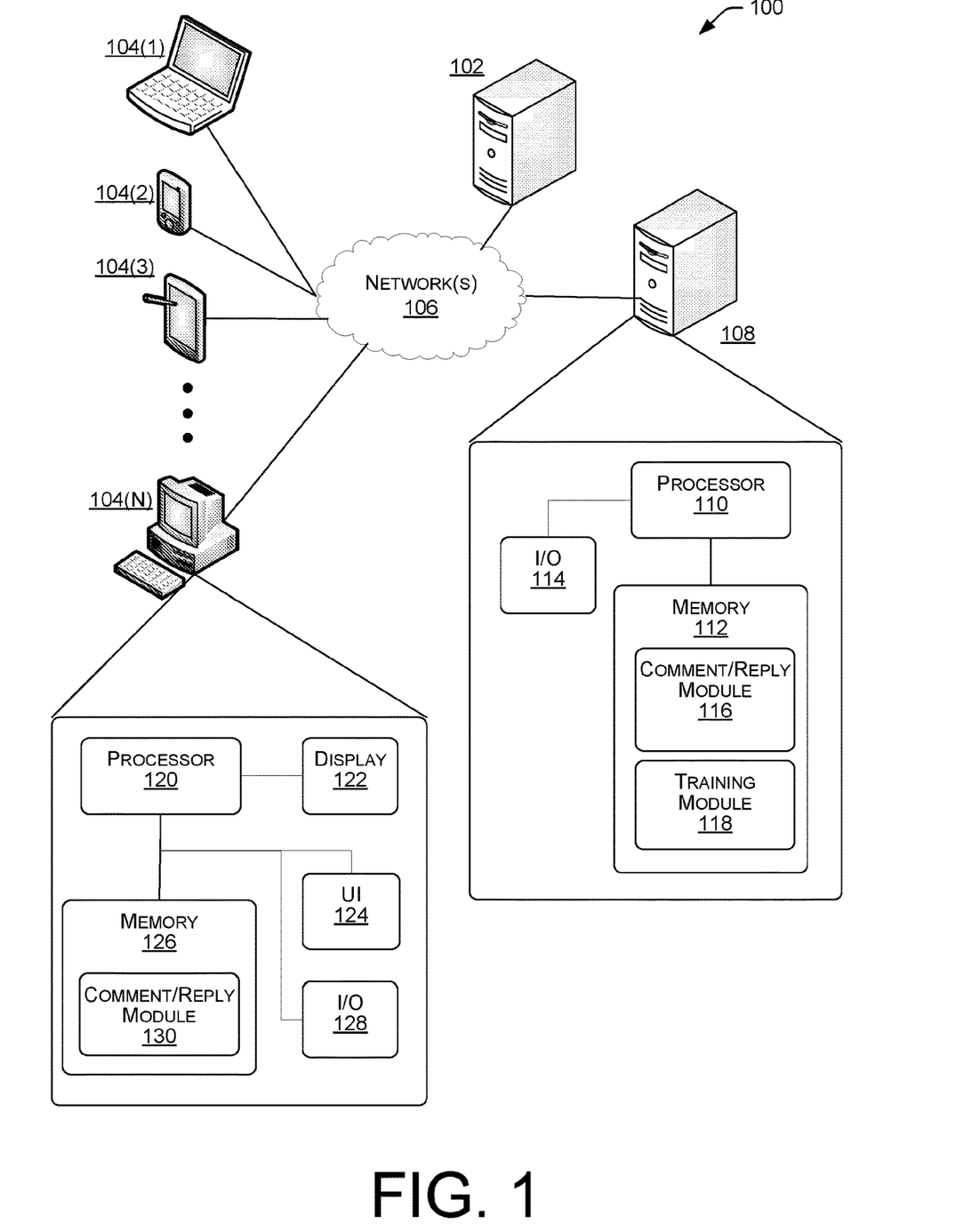
FIG. 1 is a diagram depicting an example environment for implementing a conversation application.

FIG. 1 illustrates an example environment for implementing a chatbot for news articles. The chatbot presents comments and replies to the comments according to a content item (e.g., news article) the user is currently interacting with (e.g. reading, watching, listening, sensing, etc.).

In an example, a network-based system 100 includes one or more content servers 102, a plurality of client computing devices 104(1)-(N), and one or more content/comment-reply servers 108. Content servers 102, client computing devices 104(1)-(N), and content/comment-reply servers 108 are all in communication across one or more data networks 106.

The network(s) 106 can include public networks, such as the Internet, private networks, such as an institutional and/or personal intranet, or some combination of private and public networks. The network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 106 can utilize communications protocols, including packet-based and/or datagram-based protocols such as Internet protocol (IP), transmission control protocol (TCP), user datagram protocol (UDP), or other types of protocols. Moreover, the network(s) 106 can also include a number of devices that facilitate network communications and/or form a hardware basis for the networks, such as switches, routers, gateways, access points, firewalls, base stations, repeaters, backbone devices, and the like.

In example scenarios, the servers 102, 108 can include one or more computing devices that operate in a cluster or other grouped configuration to share resources, balance load, increase performance, provide fail-over support or redundancy, or for other purposes. The server 102 can be a source system, which is a server, web server, or any other computing device for generating content items, such as that shown in FIG. 2. The servers 102, 108 can belong to a variety of categories or classes of devices such as traditional server-type devices, desktop computer-type devices, mobile-type devices, special-purpose-type devices, embedded-type devices, and/or wearable-type devices. Thus, although illustrated as tower computers, the servers 102, 108 can include a diverse variety of device types and are not limited to a particular type of device. The servers 102, 108 can represent, but are not limited to, desktop computers, server computers, web-server computers, personal computers, mobile computers, laptop computers, tablet computers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

In some examples, the content/comment-reply servers 108 can include at least processor 110, memory 112 and input/output (I/O) device 114. Memory 112 may include at least content/comment-reply module 116 and training module 118. Training module 118 trains a comment/reply model based at least on a plurality of comment/reply pairs found in a plurality of different content items.

The content/comment-reply module 116 when executed by the processor 110 causes reception of information from a specific content server 102 as requested by a user of any of the devices 104(1)-(N) and identification of comments/replies most likely to be associated with the received content. The execution of content/comment-reply module 116 by the processor 110 can also cause reception of a comment generated by a user of any of the devices 104(1)-(N) and identification of comments/replies in response to the user comment.

The client devices 104(1)-(N) include at least processor 120, display 122, user interface 124, memory 126 and I/O device 128. Memory 126 may store content/comment-reply module 130 that, when executed by the processor 120, causes reception of information from a specific content server 102 regarding content requested by a user of any of the devices 104(1)-(N) and identification of comments/replies most likely to be associated with the received content. The execution of content/comment-reply module 130 by the processor 120 can also cause reception of a comment generated by a user of any of the devices 104(1)-(N) and identification of comments/replies in response to the user comment.

Figure 5:
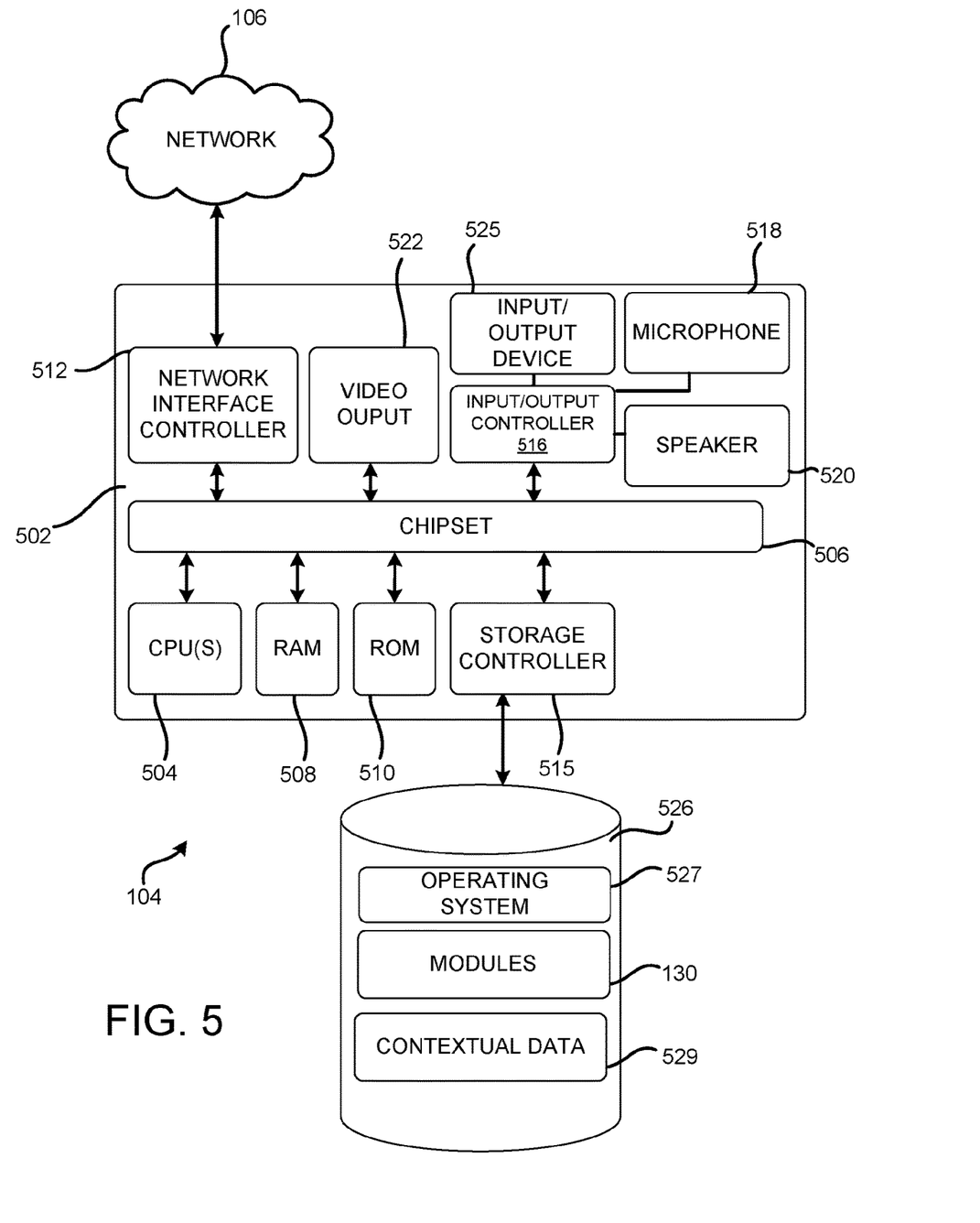
FIG. 5 is a computer architecture diagram showing an illustrative computer hardware and software architecture for a computing device capable of implementing aspects of the configurations presented herein.

Also, the processor 120, while executing other components of content/comment-reply module 130, may present a comments area on the display 122. The comments area can receive user comments related to the presented content. Examples of other components of the client devices 104 are shown in FIG. 5.

The functions provided by the modules 116, 130 may be located at other computing locations on the network or may be distributed across multiple computing locations on the network.

Figure 2:
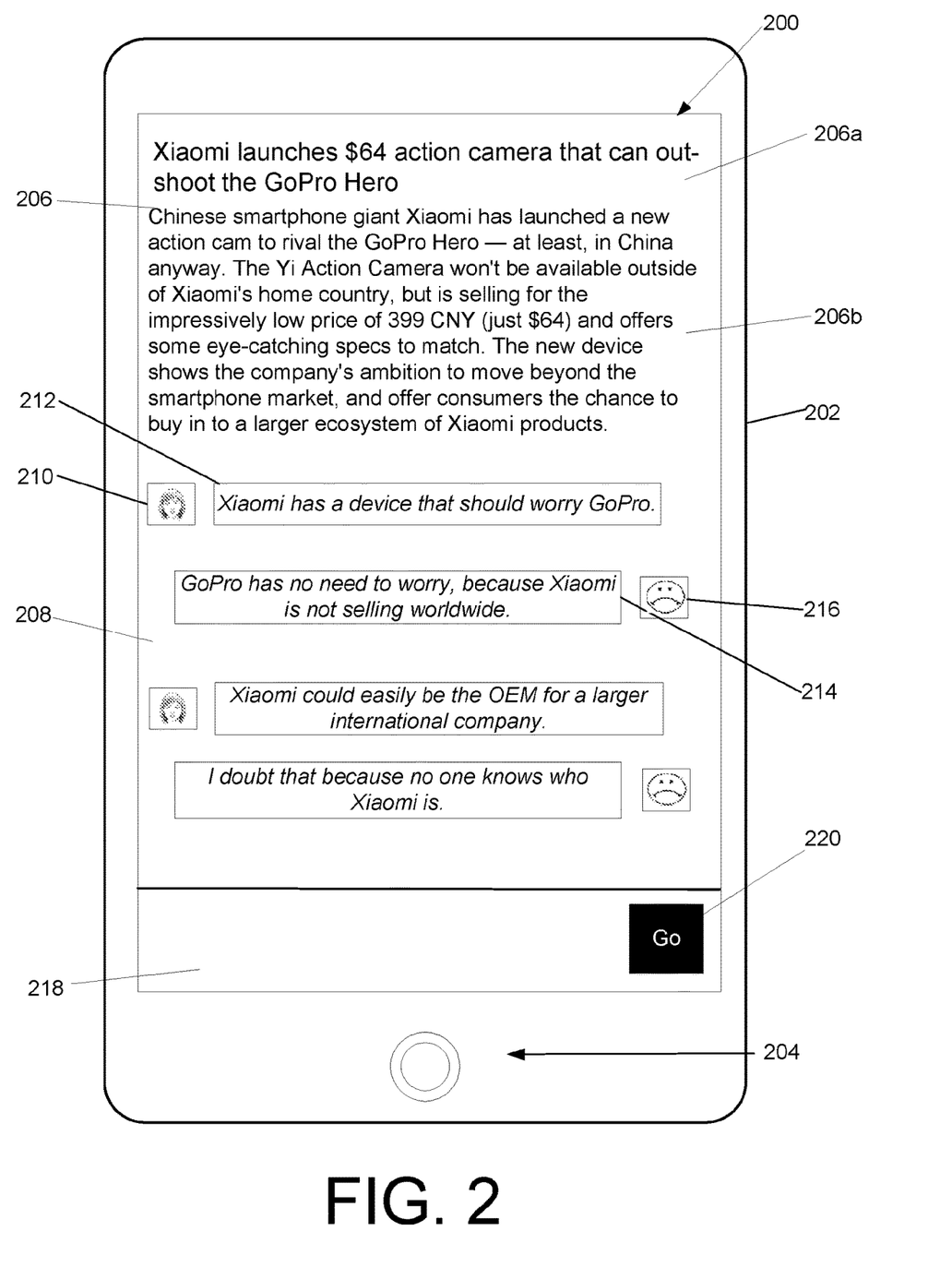
FIG. 2 shows an example mobile device enabled to present content with comments and replies based on the functions provided by components of the system shown in FIG. 1.

FIG. 2 shows an example of the client device 104 implemented as a mobile device 200 (i.e., smartphone, personal data assistant, etc.). The mobile device 200 can include display 202 and can include user interface controls 204. The content/comment-reply module 130 causes processor 120 to present requested content and associated comments/replies on display 202 by communicating with content server 102 and/or content/comment-linking server(s) 108, as necessary.

Processor 120, while executing components of content/comment-reply module 130, presents content from content server 102 based on a user's request. An example of a user's request for content may include entry of a news source website address into a browser (not shown) presented on display 202. The requested content (e.g., a news article webpage) is partially presented within content presentation area 206 of display 202.

The presented content may include a title and a body. In this example, the title is presented in title section 206a of content presentation area 206. The body of the content is presented in body section 206b of content presentation area 206.

Display 202 includes a conversation area 208. Conversation area 208 may be a selected area that shows comments and replies in a conversational format. Display 202 can present comments area 208 above, below or adjacent content presentation area 206 when viewed by a user. A first comment identified to be associated with the presented content can be presented in a first comment area 210. First comment can be identified by comment/reply module 116, 130 based at least on content that is accessed and presented in content presentation area 206 or comment/reply ranking model trained by training module 118.

Below first comment area 210 is first reply area 214. The reply shown in first reply area 214 is identified by the comment/reply ranking model as being the highest ranked response to the comment presented in first comment area 210. Other methods for selecting a first comment may be used, such as random selection.

Adjacent to first comment area 210 or first reply area 214, display 202 can present an image, a picture or an icon (212, 216) for representing a persona created for and associated with the comment/reply presented in first comment area 210 or first reply area 214, respectively.

Comment/reply module 130 may cause processor 120 to maintain an open communications link with the entity (e.g., content/comments-linking server 108) that can also identify comments and replies to the content currently presented in the content presentation area 206. The entity may be other client devices 104(1-N), if those other devices include comment/reply module 116. This open communications link allows comments from other users to be linked, sent, then presented live or in near real time on the display 202.

If the number of comments and replies exceeds a threshold or the size of a group of comments and replies exceeds a size value of comments area 208, the linked comments and replies will scroll horizontally or vertically. The scrolling can occur automatically or in response to a user's action of user interface controls 204 or display 202 (if the display includes touchscreen components).

Display 202 can also include a comment entry area 218. Comment entry area 218 can include a comment input box for allowing users to publish their own comments. The user may associate a comment with a presented comment or reply in conversation area 208 by activating a Go button 220 or comparable activation mechanism after the user has entered a comment into the comment input box of the comment entry area 218. Upon entry of a comment into comment entry area 218, the entered comment and content information are sent to the content/comments-linking server 108.

Training module 118 can train a comment/reply ranking model with data collected off-line. Comment/reply ranking model executed by content/comment-reply module(s) 116, 130 can create a conversational communication between created personas (e.g., chatbots). Also, response ranking module can create replies to user created comments. Training module 118 can identify the comments and replies for the content in a classification framework, which includes training a comment/reply ranking model based on a set of comment/reply pairs associated with various content items. A training set of extracted features from sample comments and replies is first created. The training set may use many different comments/replies previously associated with many different content postings/articles. The training set is used to train a classifier for classifying/ranking instances using natural language processing techniques. This is described as follows.

A candidate chat response triple $T=\{A, C, R\}$ can be a function of a content item $A=\{a_1, a_2, \ldots, a_n\}$ (a=article) with a chat comment set $C=\{c_1, c_2, \ldots, c_m\}$ and a reply set $R=\{r_1, r_2, \ldots, r_m\}$. The function can include a Cartesian product of these two sets C and R. Training module 118 can extract lexical-level, entity-level, topic-level and quality control features from candidate chat response triples T to create a feature vector v(tacr). Training module 118 can assign a category of tacr to a label=1 and any other non-reply pairs $t_{acr}'$ to be 0. A non-reply pair includes a reply that is an irrelevant reply to the comment of the pair. Training instances are inputted into a support vector machine (SVM) classifier that learns a weight value for each candidate chat reply triple. The comment/reply pairs can be ranked based on the weight values.

For a new comment-reply pair, the SVM classifier can predict the possibility of the pair being true for the associated content.

Examples of extracted features are listed in Table 1.

TABLE 1

| | Extracted Features |
|---|---|
| Lexical-level | Tf-idf cosine similarity |
| | Ave. number of word matches |
| | Ave. number of stem matches |
| | Ave. number of Part-of-Speech (POS) matches |
| | Ave. number of function word matches |
| | Translation model score |
| Entity-level | Ave. number of entity type matches |
| | Ave. number of entity matches (for each type) |
| Topic-level | LDA topic vector cosine similarity |
| | Word embedding vector cosine similarity |
| | Session consistency score |
| | Sentiment constraint |
| Quality | Response quality score |

Comment/reply ranking model is used to measure the correspondence (e.g., rank) between chat comment/reply pairs. Training module 118 can collect lots of chat comment/reply pairs for one single news content item to make training data T. T is used to generate positive and negative examples that will be used to train the SVM model/classifier according to the following steps.

The lexical features include identifying a cosine similarity between a chat comment and a corresponding reply represented as two tf-idf vectors. TF means term frequency of a single word, IDF means inverse document frequency of a single word. TF-IDF means tf*idf of the word. Every word has a tf*idf value, so a sentence (e.g., chat comment, reply) can be represented as a tf-idf vector. The number of common words, stems, POS tags and function words are also used.

The following is an example list of POS tags:
CC Coordinating conjunction
CD Cardinal number
DT Determiner
EX Existential there
FW Foreign word
IN Preposition or subordinating conjunction
JJ Adjective
JJR Adjective, comparative
HS Adjective, superlative
LS List item marker
MD Modal
NN Noun, singular or mass
NNS Noun, plural
NNP Proper noun, singular
NNPS Proper noun, plural
PDT Predeterminer
POS Possessive ending
PRP Personal pronoun
PRP$ Possessive pronoun
RB Adverb
RBR Adverb, comparative
RBS Adverb, superlative
RP Particle
SYM Symbol
TO to
UH Interjection
VB Verb, base form
VBD Verb, past tense
VBG Verb, gerund or present participle
VBN Verb, past participle
VBP Verb, non3rd person singular present
VBZ Verb, 3rd person singular present
WDT Wh-determiner
WP Wh-pronoun
WP$ Possessive wh-pronoun
WRB Wh-adverb The function words include the verbs and the nouns. In addition, the lexical features can include a translation model score that indicates word matching in a statistical way. Training module 118 can use the lexical features to generate feature vectors.

Training module 118 can compute the entity-level features with the number of entity type matches and the number of entity matches within each type. Training module 118 can average these numbers of match by the chat comment/reply pairs' length. If the number of matches is N, the average is N/length(A), where A is the chat comment. The topic-level features are based on latent Dirichlet allocation (LDA) analysis of the comments and replies. After LDA, training module 118 can generate a topic vector for each chat comment and reply, where each dimension means a latent topic in the text. Training module 118 can use word embedding vector feature as a topic-level feature. Word embedding is a term used in deep learning algorithms, which means a word can be represented as a high dimensional real-valued vector. This vector can be considered as the encoding of the contextual information. Training module 118 can also consider session consistency and sentiment constraint. Session consistency and sentiment constraints are determined by users who start the chat. For example, the chat engine may agree or disagree with the users. The users can select what the chat engine generate, more positive responses or more negative responses.

Training module 118 can calculate the cosine similarity of these vectors to represent the semantic similarity between chat-response pairs.

A person managing this training operation applies weights to the feature vectors of each chat comment/reply pair based on the person's perception of whether the pair is a likely link to each other. The weighted pairs are applied to a modeler/ classifier, such as an SVM classifier, which creates a model/classifier for ranking chat comments and reply pairs.

Illustrative Processes

Figure 3:
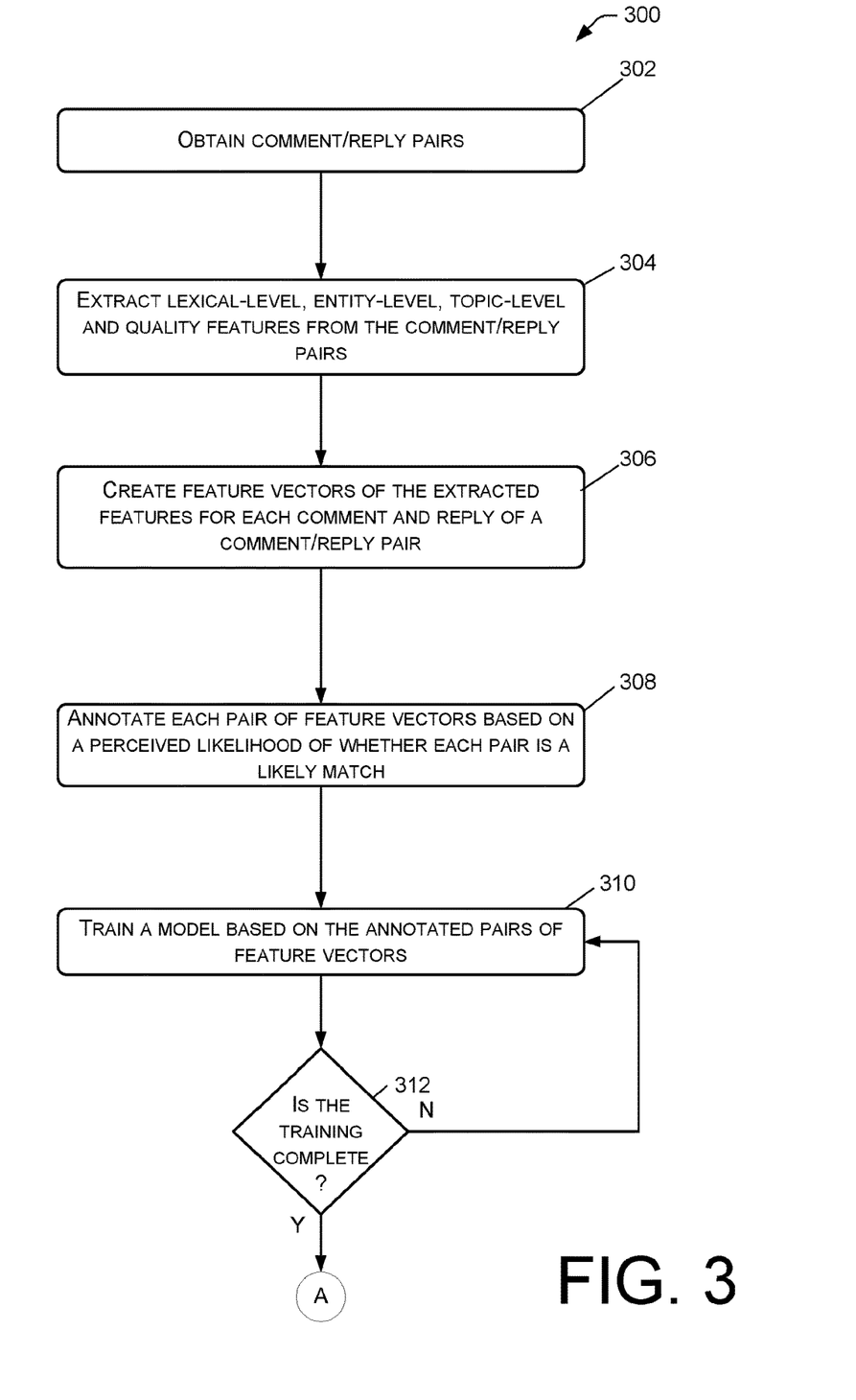
FIG. 3 is a flow diagram depicting an example operation of process for training a comment/reply presentation system.
Figure 4:
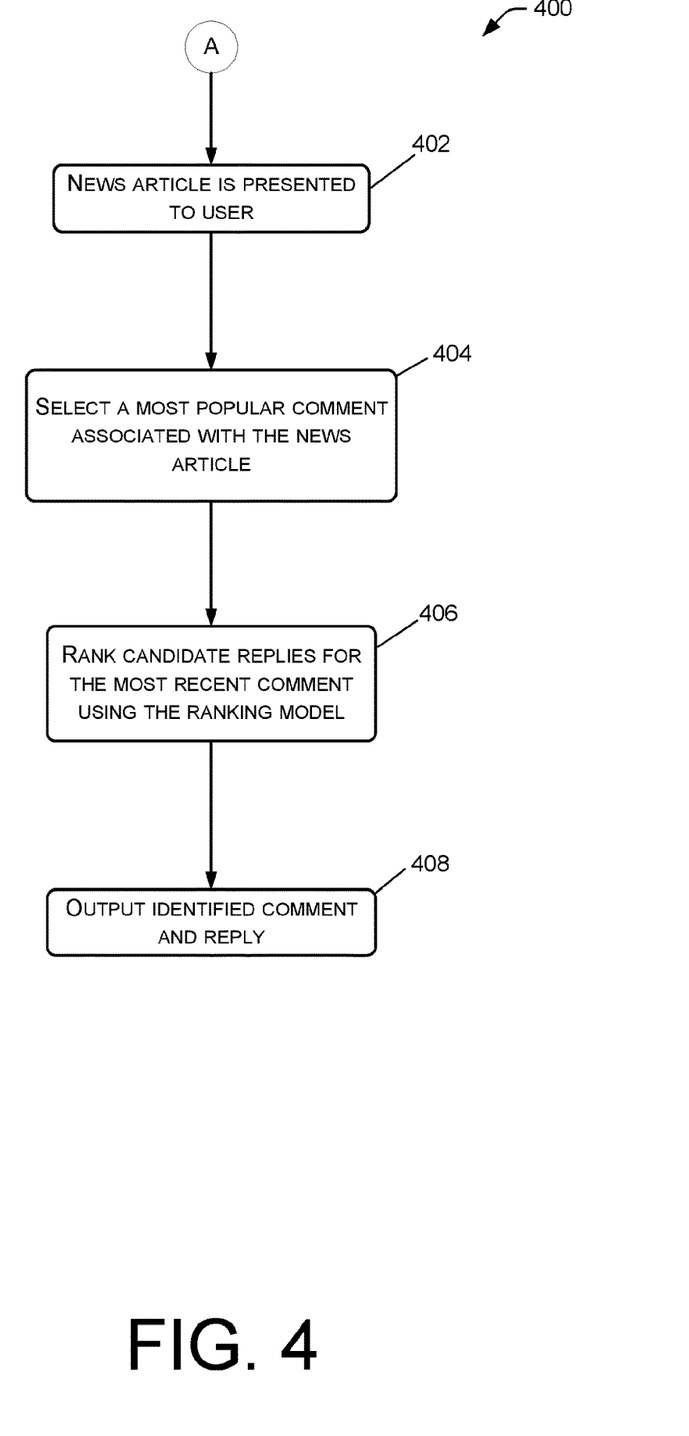
FIG. 4 shows a flow diagram depicting an example operation of a process for predicting comments and replies.

The processes 300-400 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Computer-executable instructions may include routines, programs, objects, components, data structures, and the like that perform particular functions or implement particular abstract types of data. The order in which the operations are described is not intended to be construed as a limitation, and any number of the described blocks may be combined in any order and/or in parallel to implement the illustrated process. One or more of the processes described herein may occur independently or in relation in any order, whether in series or parallel.

The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

FIG. 3 illustrates a high-level process 300 for training a comment/reply ranking model for use in a conversational creation process. The process 300 is a specific implementation using natural language processing (NLP) techniques. First at a block 302, a set of comment-reply pairs are obtained from training comments and replies associate with various content items. The set of pairs may be obtained for various content item genres, for example world news, local news, sports, opinion, food, entertainment, music, etc. Using different genre sets of pairs results in different genre training models. When using a comment/reply ranking model associated with a genre similar to currently viewed content, then the process of linking a comment to the content may produce more accurate comment and reply results.

At a block 304, training module 118 can extract lexical-level, entity-level, topic-level and quality features from the comment/reply pairs. Table 1 shows example extracted features.

At a block 306, training module 118 can create feature vectors using the extracted features for each comment and reply of a comment/reply pair. The vectors are multidimensional with the features being the dimensions.

Features are extracted from the comment and sentence of the pair based on the above analyses to get feature vectors for the comment and reply of each pair:

$F_{comment}$ $F_{reply}$

Assuming training has already occurred, these feature vectors along with feature vectors of all the other comment/reply pairs are analyzed with regard to the trained model/classifier (trained SVM classifier) to determine which of the replies is to be identified as the highest rank for the comment.

Although the above example is directed to linking text comments to text replies. Implementations of this invention could be applied to audible comments/replies and audio and/or video content. Voice to text may be used as a technique for converting voice to text. Video analysis technologies may be used to identify events (e.g., change events) in video and then using that information as a basis for ranking comments/replies.

At a block 308, training module 118 can annotate each pair of feature vectors based on a perceived likelihood of whether each pair is a match. This annotation may be in the form of a weight value assigned to the pair of feature vectors.

At a block 310, training module 118 can train a model or a classifier based on the annotated pairs of feature vectors. In one example, an SVM generates the model or classifier based at least on the annotated pairs of feature vectors.

At a decision block 312, once the training is determined to be complete, the process 300 is ready for analyzing and identifying comments and replies for an identified content item, see process 400 in FIG. 4.

FIG. 4 illustrates a high-level process 400 for automatically identifying comments and replies for an identified content item. At a block 402, content item (e.g., news article) is requested by and presented to a computing device (e.g., 104) operated by a user. For example, a user using user interface 124 causes content server 102 to present a particular news article to the user via display 122 and I/O 128. This can be accomplished by the user entering a website address or selecting a link associated with the website address for the desired article.

At a block 404, comment/reply module 116, 130 can select a starting/first comment. The selected comment was previously identified as receiving more positive feedback from comments from other users, from a user rating data, or from user activity data indicating a priority of a comment. This feedback can be considered approvals by other users. The comments from other users, the user rating data, and the user activity data indicating the priority of a comment can be selected from sampled comments and replies included in previously sampled conversations relating to presented content.

At a block 406, candidate replies to the most recent comment are ranked according to the model trained by training module 118. The ranking may also use a chat position set automatically or by a setting identified (e.g., positive or negative) by the user using the user interface 124.

Then at a block 408, comment/reply module 116, 130 causes display 122 to present the highest ranking comment/reply. The presentation can include also presenting the user selected content item (e.g., FIG. 2) or comment/reply module 116, 130 can present numerous comment/reply pairs sequentially on display 122.

FIG. 5 shows additional details of an example computer architecture for the components shown in FIG. 1 capable of executing the program components described above for providing a conversational system. The computer architecture shown in FIG. 5 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 5 may be utilized to execute any of the software components described above. Although some of the components described herein are specific to the client device 104, it can be appreciated that such components, and other components may be part of the server 108.

The client device 104 includes a baseboard 502, or "motherboard," which is a printed circuit board to which a multitude of components or devices may be connected by way of a system bus or other electrical communication paths. In one illustrative configuration, one or more central processing units ("CPUs") 504 operate in conjunction with a chipset 506. The CPUs 504 may be standard programmable processors that perform arithmetic and logical operations necessary for the operation of the client device 104.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the client device 104. The chipset 506 may further provide an interface to a computer-readable storage medium such as a read-only memory ("ROM") 510 or non-volatile RAM ("NVRAM") for storing basic routines that help to startup the client device 104 and to transfer information between the various components and devices. The ROM 510 or NVRAM may also store other software components necessary for the operation of the client device 104 in accordance with the configurations described herein.

The client device 104 may operate in a networked environment using logical connections to remote computing devices and computer systems through a network, such as the local area network 106. The chipset 506 may include functionality for providing network connectivity through a network interface controller (NIC) 512, such as a gigabit Ethernet adapter. The NIC 512 is capable of connecting the client device 104 to other computing devices over the network 106. It should be appreciated that multiple NICs 512 may be present in the client device 104, connecting the computer to other types of networks and remote computer systems. The network 106 allows the client device 104 to communicate with remote services and servers, such as the servers 102, 108.

The client device 104 may be connected to a mass storage device 526 that provides non-volatile storage for the computing device. The mass storage device 526 may store system programs, application programs, other program modules, and data, which have been described in greater detail herein. The mass storage device 526 may be connected to the client device 104 through a storage controller 515 connected to the chipset 506. The mass storage device 526 may consist of one or more physical storage units. The storage controller 515 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 526, other storage media and the storage controller 515 may include MultiMediaCard (MMC) components, eMMC components, Secure Digital (SD) components, PCI Express components, or the like.

The client device 104 may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the client device 104 may store information to the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The client device 104 may further read information from the mass storage device 526 by detecting the physical states or characteristics of one or more particular locations within the physical storage units.

In addition to the mass storage device 526 described above, the client device 104 may have access to other computer-readable media to store and retrieve information, such as program modules, data structures, or other data. Thus, although the program module 116, 130 and other modules are depicted as data and software stored in the mass storage device 526, it should be appreciated that these components and/or other modules may be stored, at least in part, in other computer-readable storage media of the client device 104. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the client device 104.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the client device 104. For purposes of the claims, the phrase "computer storage medium," and variations thereof, does not include waves, signals and/or other transitory and/or intangible communication media.

The mass storage device 526 may store an operating system 527 utilized to control the operation of the client device 104. According to one configuration, the operating system comprises a gaming operating system. According to another configuration, the operating system comprises the WINDOWS®, UNIX, ANDROID, WINDOWS PHONE or iOS operating systems, available from their respective manufacturers. It should be appreciated that other operating systems may also be utilized. The mass storage device 526 may store other system or application programs and data utilized by the client device 104, such as the program modules 116, 130, contextual data 529 and/or any of the other software components and data described above. The mass storage device 526 might also store other programs and data not specifically identified herein.

In one configuration, the mass storage device 526 or other computer-readable storage media is encoded with computer-executable instructions which, when loaded into the client device 104, transform the computer from a general-purpose computing system into a special-purpose computer capable of implementing the configurations described herein. These computer-executable instructions transform the client device 104 by specifying how the CPUs 504 transition between states, as described above. According to one configuration, the client device 104 has access to computer-readable storage media storing computer-executable instructions which, when executed by the client device 104, perform the various routines described above with regard to FIG. 5 and the other figures. The client device 104 might also include computer-readable storage media for performing any of the other computer-implemented operations described herein.

The client device 104 may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controllers 516 is in communication with an input/output device 525. The input/output controller 516 may provide output to a display, such as a computer monitor, a HMD, a flat-panel display, a digital projector, a printer, a plotter, or other type of output device. The input/output controller 516 may provide input communication with other devices such as a microphone 518, a speaker 520, game controllers and/or audio devices. In addition, or alternatively, a video output 522 may be in communication with the chipset 506 and operate independent of the input/output controllers 516. It will be appreciated that the client device 104 may not include all of the components shown in FIG. 5, may include other components that are not explicitly shown in FIG. 5, or may utilize an architecture completely different than that shown in FIG. 5.

Example Clauses

A computer-implemented method comprising: receiving, at a computing device, information associated with a content item produced by a source system, the content item being accessible to other the computing devices via a network; outputting at least a portion of the content item; in response to receiving the information, identifying a start comment and identifying a reply to the start comment based at least in part on a ranking model; and outputting the start comment and the reply.

The computer-implemented method of the previous clause, wherein the identifying the start comment comprises: determining from a plurality of comments an amount of likes for the comments of the plurality of the comments; and identifying the start comment as the comment of the plurality of comments having the greatest amount of likes.

The computer-implemented method of any of the previous clauses, wherein the identifying the reply comprises: identifying a plurality of pairs, the plurality of pairs comprises the start comment and one of a plurality of replies; ranking the plurality of pairs in response to execution of the ranking model; and identifying a reply in the pair with the highest rank as the reply to the start comment.

The computer-implemented method of any of the previous clauses, further comprising training the ranking model: identifying lexical-level features for a plurality of pairs of comments and replies previously posted to one or more content item webpages; identifying entity-level features for the plurality of pairs; identifying topic vectors for the plurality of pairs; identifying one or more quality features for the plurality of pairs; creating feature vectors for the plurality of pairs based at least in part on the identified lexical-level features, entity-level features, topic vectors and one or more quality features; and creating the ranking model based at least in part on the created feature vectors.

The computer-implemented method of any of the previous clauses, wherein creating the ranking model comprises: applying weight values to the plurality of pairs; and creating a classifier based on the weight values.

The computer-implemented method of any of the previous clauses, further comprising creating the classifier using a support vector machine.

The computer-implemented method of any of the previous clauses, wherein the content item comprises a news article webpage or a posting webpage.

The computer-implemented method of any of the previous clauses, further comprising: receiving a comment from the computing device; in response to receiving the comment from the computing device, identifying a reply to the comment from the computing device based at least in part on the ranking model; and outputting the reply identified by the ranking model.

A computing device comprising: a processor; a display device; and a computer-readable storage medium in communication with the processor, the computer-readable storage medium having computer-executable instructions stored thereupon which, when executed by the processor, cause the computing device to: receive information associated with a content item produced by a source system, the content item being accessible to other the computing devices via a network; in response to receiving the information, identify a start comment; in response to identifying the start comment, identify a reply to the start comment using at least a ranking model; and output the start comment and the reply.

The computing device of any of the previous clauses, wherein the identifying the start comment comprises: determining from a plurality of comments an amount of likes for the comments of the plurality of the comments; and identifying the start comment as the comment of the plurality of comments having the greatest amount of likes.

The computing device of any of the previous clauses, wherein the identifying the reply comprises: identifying a plurality of pairs, the plurality of pairs comprises the start comment and one of a plurality of replies; ranking the plurality of pairs in response to execution of the ranking model; and identifying a reply in the pair with the highest rank as the reply to the start comment.

The computing device of any of the previous clauses, wherein the computer-readable storage medium has further computer-executable instructions stored thereon that cause the computer to: identify lexical-level features for a plurality of pairs of comments and replies previously posted to one or more content item webpages; identify entity-level features for the plurality of pairs; identify topic vectors for the plurality of pairs; identify one or more quality features for the plurality of pairs; create feature vectors for the plurality of pairs based at least in part on the lexical-level features, entity-level features, topic vectors and one or more quality features; and create the ranking model based at least in part on the feature vectors.

The computing device of any of the previous clauses, wherein the creating the ranking model comprises: applying weight values to the plurality of pairs; and creating a classifier based on the weight values.

The computing device of any of the previous clauses, wherein the computer-readable storage medium has further computer-executable instructions stored thereon that cause the computer to: create the classifier using a support vector machine.

The computing device of any of the previous clauses, wherein the content item comprises a news article webpage or a posting webpage.

The computing device of any of the previous clauses, wherein the computer-readable storage medium has further computer-executable instructions stored thereon that cause the computer to: receive a comment from the computing device; in response to receiving the comment from the computing device, identify a reply to the comment from the computing device based at least in part on the ranking model; and output the reply identified by the ranking model.

An optical disk, a solid state storage device, or a magnetic storage device having computer readable instructions stored thereupon that, when executed by a computer, cause the computer to: receive a content item produced by a source system, the content item being accessible to other the computing devices via a network; in response to receiving the content item, identify a start comment; in response to identifying the start comment, identify a reply to the start comment using at least a ranking model; and output the start comment and the reply.

The optical disk, solid state storage device, or magnetic storage device of any of the previous clauses, wherein the computer readable instructions further cause the computer to: determine from a plurality of comments an amount of likes for the comments of the plurality of the comments; and identify the start comment as the comment of the plurality of comments having the greatest amount of likes.

The optical disk, solid state storage device, or magnetic storage device of any of the previous clauses, wherein the computer readable instructions further cause the computer to: identify a plurality of pairs, the plurality of pairs comprises the start comment and one of a plurality of replies; rank the plurality of pairs in response to execution of the ranking model; and identify a reply in the pair with the highest rank as the reply to the start comment.

The optical disk, solid state storage device, or magnetic storage device of claim 17, wherein the computer readable instructions further cause the computer to: identify lexical-level features for a plurality of pairs of comments and replies previously posted to one or more content item webpages; identify entity-level features for the plurality of pairs; identify topic vectors for the plurality of pairs; identify one or more quality features for the plurality of pairs; create feature vectors for the plurality of pairs based at least in part on the lexical-level features, entity-level features, topic vectors and one or more quality features; and create the ranking model based at least in part on the feature vectors.

A system comprising: a means for receiving information associated with a content item produced by a source system, the content item being accessible to other the computing devices via a network; a means for outputting at least a portion of the content item; in response to receiving the information, a means for identifying a start comment and a means for identifying a reply to the start comment based at least in part on a ranking model; and a means for outputting the start comment and the reply.

The system of the previous clause, wherein the means for identifying the start comment comprises: determining from a plurality of comments an amount of likes for the comments of the plurality of the comments; and identifying the start comment as the comment of the plurality of comments having the greatest amount of likes.

The system of any of the previous clauses, wherein the means for identifying the reply comprises: identifying a plurality of pairs, the plurality of pairs comprises the start comment and one of a plurality of replies; ranking the plurality of pairs in response to execution of the ranking model; and identifying a reply in the pair with the highest rank as the reply to the start comment.

The system of any of the previous clauses, further comprising a means for training the ranking model by: identifying lexical-level features for a plurality of pairs of comments and replies previously posted to one or more content item webpages; identifying entity-level features for the plurality of pairs; identifying topic vectors for the plurality of pairs; identifying one or more quality features for the plurality of pairs; creating feature vectors for the plurality of pairs based at least in part on the identified lexical-level features, entity-level features, topic vectors and one or more quality features; and creating the ranking model based at least in part on the created feature vectors.

The system of any of the previous clauses, wherein the means for creating the ranking model comprises applying weight values to the plurality of pairs; and creating a classifier based on the weight values.

The system of any of the previous clauses, further comprising a means for creating the classifier using a support vector machine.

The system of any of the previous clauses, wherein the content item comprises a news article webpage or a posting webpage.

The system of any of the previous clauses, further comprising: a means for receiving a comment from the computing device; in response to receiving the comment from the computing device, a means for identifying a reply to the comment from the computing device based at least in part on the ranking model; and a means for outputting the reply identified by the ranking model.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple suboperations, and/or executed in parallel to implement the described processes. The described processes can be performed by resources associated with one or more device(s), such as one or more internal or external CPUs or GPUs, and/or one or more pieces of hardware logic, such as FPGAs, DSPs, or other types of accelerators.

All of the methods and processes described above may be embodied in, and fully automated via, software code modules executed by one or more general-purpose computers or processors. The code modules may be stored in any type of computer-readable storage medium or other computer storage device. Some or all of the methods may alternatively be embodied in specialized computer hardware.

Any routine descriptions, elements, or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved, as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A computing device comprising:
   a processor;
   a display device; and
   a computer-readable storage medium in communication with the processor, the computer-readable storage medium having computer-executable instructions stored thereupon which, when executed by the processor, cause the computing device to:
   identify lexical-level features for a plurality of pairs of comments and replies previously posted to one or more content item webpages, the lexical-level features including identifying a cosine similarity between two vectors, a first of the two vectors representing a comment of one of the plurality of pairs of comments and replies and a second of the two vectors representing a reply of the one of the plurality of pairs of comments and replies, the two vectors associated with a term frequency of a term in the one of the pair of the plurality of replies and comments;
   receive information associated with a content item produced by a source system, the content item being accessible to other computing devices via a network;
   in response to receiving the information, identify a start comment;
   in response to identifying the start comment, create a reply to the start comment using at least a ranking model, the ranking model created at least in part on the identified lexical-level features; and
   output the start comment and the reply.

2. The computing device of claim 1, wherein the identifying the start comment comprises:
   determining from a plurality of comments an amount of likes for the comments of the plurality of the comments; and
   identifying the start comment as the comment of the plurality of comments having a greatest amount of likes.

3. The computing device according to claim 1, wherein the creating the reply comprises:
   identifying a plurality of pairs, the plurality of pairs comprises the start comment and one of a plurality of replies;
   ranking the plurality of pairs in response to execution of the ranking model; and
   identifying a reply in the pair with a highest rank as the reply to the start comment.

4. The computing device according to claim 1, wherein the computer-readable storage medium has further computer-executable instructions stored thereon that cause the computing device to:
   identify entity-level features for the plurality of pairs;
   identify topic vectors for the plurality of pairs;
   identify one or more quality features for the plurality of pairs;
   create feature vectors for the plurality of pairs based at least in part on the lexical-level features, entity-level features, topic vectors and one or more quality features; and create the ranking model based at least in part on the feature vectors.

5. The computing device according to claim 1, wherein the computer-readable storage medium has further computer-executable instructions stored thereon that cause the computing device to:
   receive a comment from the computing device;
   in response to receiving the comment from the computing device, identify a reply to the comment from the computing device based at least in part on the ranking model; and
   output the reply identified by the ranking model.

6. The computing device according to claim 1, wherein the computer-readable storage medium has further computer-executable instructions stored thereon that cause the computing device to:
   apply weight values to the plurality of pairs; and
   create a classifier based on the weight values.

7. The computing device according to claim 6, wherein the computer-readable storage medium has further computer-executable instructions stored thereon that cause the computing device to create the classifier using a support vector machine.

8. The computing device according to claim 1, wherein each of the two vectors is represented as a tf-idf vector, wherein tf is representative of a term frequency of a single word and idf is representative of an inverse document frequency of the single word.

9. The computing device according to claim 1, wherein the lexical-level features additionally include a translation model score representative of statistical word matching in the comment and reply of the one of the plurality of pairs of comments and replies.

10. A computer-implemented method comprising:
identifying lexical-level features for a plurality of pairs of comments and replies previously posted to one or more content item webpages, the lexical-level features including a cosine similarity between two vectors, a first of the two vectors representing a comment of one of the plurality of pairs of comments and replies and a second of the two vectors representing a reply of the one of the plurality of pairs of comments and replies, the two vectors associated with a term frequency of a term in the one of the pair of the plurality of replies and comments;
receiving, at a computing device, information associated with a content item produced by a source system, the content item being accessible to other computing devices via a network;
outputting at least a portion of the content item;
in response to receiving the information, generating a start comment and identifying a reply to the start comment based at least in part on a ranking model, the ranking model created at least in part on the identified lexical-level features; and
outputting the start comment and the reply concurrently with the content item.

11. The computer-implemented method of claim 10, wherein the identifying the start comment comprises:
determining from a plurality of comments an amount of likes for the comments of the plurality of the comments; and
identifying the start comment as the comment of the plurality of comments having a greatest amount of likes.

12. The computer-implemented method according to claim 10, wherein the identifying the reply comprises:
identifying a plurality of pairs, the plurality of pairs comprises the start comment and one of a plurality of replies;
ranking the plurality of pairs in response to execution of the ranking model; and
identifying a reply in the pair with a highest rank as the reply to the start comment.

13. The computer-implemented method according to claim 10, further comprising training the ranking model by:
identifying entity-level features for the plurality of pairs;
identifying topic vectors for the plurality of pairs;
identifying one or more quality features for the plurality of pairs;
creating feature vectors for the plurality of pairs based at least in part on the identified lexical-level features, entity-level features, topic vectors and one or more quality features; and
creating the ranking model based at least in part on the created feature vectors.

14. The computer-implemented method according to claim 10, wherein creating the ranking model comprises:
applying weight values to the plurality of pairs; and
creating a classifier based on the weight values.

15. The computer-implemented method according to claim 14, further comprising creating the classifier using a support vector machine.

16. The computer-implemented method according to claim 10, wherein the content item comprises a news article webpage or a posting webpage.

17. The computer-implemented method according to claim 10, further comprising:
receiving a comment from the computing device;
in response to receiving the comment from the computing device, identifying a reply to the comment from the computing device based at least in part on the ranking model; and
outputting the reply identified by the ranking model.

18. A computer-readable storage medium having computer-executable instructions stored thereupon which, when executed by a computer, cause the computer to perform the method according to claim 10.

19. The computer-implemented method according to claim 10, wherein each of the two vectors is represented as a tf-idf vector, wherein tf is representative of a term frequency of a single word and idf is representative of an inverse document frequency of the single word.

20. A method of creating a reply model, the method including:
identifying lexical-level features for a plurality of pairs of comments and replies previously posted to one or more content item webpages, the lexical-level features including identifying a cosine similarity between two vectors, a first of the two vectors representing a comment of one of the plurality of pairs of comments and replies and a second of the two vectors representing a reply of the one of the plurality of pairs of comments and replies, the two vectors associated with a term frequency of a term in the one of the pair of the plurality of replies and comments;
identify entity-level features for the plurality of pairs;
identify topic vectors for the plurality of pairs;
identify one or more quality features for the plurality of pairs;
create a plurality of pairs of feature vectors, each pair of feature vectors including a feature vector for each comment and a feature vector for each reply for the plurality of pairs of comments and replies based at least in part on the lexical-level features, entity-level features, topic vectors and one or more quality features;
assign a weight value to each pair of feature vectors, the weight value indicating a likelihood that the reply of the comment and reply pair is an appropriate response to the comment of the comment and reply pair;
train a reply model based on the weighted pairs of feature vectors.

* * * * *